United States Patent [19]

Ebihara et al.

[11] Patent Number: 4,968,996

[45] Date of Patent: Nov. 6, 1990

[54] THERMAL PRINTHEAD

[75] Inventors: Takashi Ebihara; Takeshi Narita, both of Kanagawa, Japan

[73] Assignee: N. H. K. Spring Co., Ltd., Kanagawa, Japan

[21] Appl. No.: 278,871

[22] Filed: Dec. 1, 1988

[51] Int. Cl.⁵ .............................................. G01D 15/10
[52] U.S. Cl. .................................. 346/76 PH; 219/216
[58] Field of Search ..................... 346/76 PH; 219/246

[56] References Cited

U.S. PATENT DOCUMENTS 4,651,168 3/1987 Terajima et al. ............... 346/76 PH
4,707,708 11/1987 Kitagashi et al. .............. 346/76 PH

*Primary Examiner*—Bruce A. Reynolds
*Assistant Examiner*—Gerald E. Preston
*Attorney, Agent, or Firm*—Skjerven, Morrill, MacPherson, Franklin & Friel

[57] ABSTRACT

An improved thermal printhead in which the base plate is provided with a print-end surface which is narrower than the thickness of the base plate by forming an inclined surface along one of the corner edges of the end surface adjoining one of the major surfaces of the base plate. Alternatively, a narrower end surface serving as the print-end surface may be defined by forming inclined surfaces along the two corner edges of the original end surface of the base plate. In either case, by appropriate selection of the width of the print-end surface, a glaze layer of a suitable property can be formed over the print-end surface by making use of the surface tension of the glaze layer in its molten state. By chamfering the lateral edges of the corners along either lateral end of the print-end surface, the terminal printhead is provided with a smooth contact surface which has an optimum lateral width for favorable contact with print media and a high level of smoothness for favorable movement of the printhead relative to print media.

14 Claims, 4 Drawing Sheets

THERMAL PRINTHEAD

TECHNICAL FIELD

The present invention relates to improved endsurface type thermal printheads for use in printers, facsimile machines, etc., and in particular to such thermal printheads which can be favorably used on rough printing paper. This invention also relates to base plates for use in such thermal printheads which may be made of either ceramic material or metallic material.

BACKGROUND OF THE INVENTION

According to a conventional thermal printhead of planar type, as shown in FIG. 1, the thermal printhead 4 opposes printing paper 2, supported against a platen 1, with its major surface, interposing a thermal transfer ink ribbon 3 therebetween. The thermal printhead 4 comprises a planar base plate 4a which is made of, for instance, alumina or other ceramic material, and a heat generating portion 4b formed on the major surface of the base plate 4a in a substantially semi-cylindrical shape. By selectively heating the resistive elements of the heat generation portion 4b by conducting electric current thereto and sliding the heat generation portion 4b over the surface of the printing paper 2 while interposing the transfer ink ribbon 3 therebetween, some of the ink in the ink ribbon 3 is deposited onto the printing paper 2 according to the distribution of heat in the heat generating portion 4b, and a desired print pattern is formed on the printing paper 2. However, if the surface texture of the printing paper 2 is excessively coarse, the contact between the ink ribbon 3 and the printhead 4 becomes insufficient, and the print quality is impaired because the ink would not be transferred from the ink ribbon 3 to the printing paper 2 in some places.

To overcome this problem, it has been proposed to use an end-surface type thermal printhead, having a heat generating portion 4b at an end surface of a base plate 4a, as shown in FIG. 2. FIG. 3 shows an example of such an end-surface type thermal printhead which was disclosed in Japanese patent laid-open publication No. 60-21263. According to this prior invention, the thermal printhead 4 comprises a ceramic base plate 11 and a glaze layer 12 formed on the end surface 13 of the base plate 11; the thickness A of the central part of the glaze layer 12 is selected to be approximately 80 micrometers. The thickness T of the base plate 11 is selected to be from 1 to 2.5 mm to give the surface of the glaze layer 12 a radius of curvature of from 2 to 10 mm. Such a glaze layer can be readily produced by printing a glass frit layer over the end surface of the base plate 11 or placing glass frit in sheet form over the end surface and baking it, by virtue of the surface tension of the molten glaze material tending to form a curved surface as determined by the material properties of the molten glaze layer and the thickness of the base plate. Thus, the thickness of the base plate is an important factor in determining the surface contour of the glaze layer 12.

However, according to the experiments conducted by the inventors, it was discovered that the radius of curvature R of the surface of the glaze layer 12 should be less than 2 millimeters and the thickness A of the central part of the glaze layer 12 is required to be less than 40 micrometers in order to obtain a satisfactory thermal responsiveness and a high print quality even when relatively rough paper is used. To achieve this goal, the thickness of the base plate is required to be less than one millimeter, and the mechanical strength of the base plate would be insufficient.

Furthermore, an end-surface type thermal printhead tends to cause a problem in the movement of the printhead relative to the paper particularly when the radius of curvature of the heat generating portion is reduced, and the formation of fine print elements in the heat generating portion which is located in a very narrow end surface of the base plate presents some problem to the efficiency of the manufacturing process.

SUMMARY OF THE INVENTION

In view of such problems of the prior art, a primary object of the present invention is to provide a thermal printhead which can produce a high print quality even when printing paper of relatively coarse texture is used.

A second object of the present invention is to provide a thermal printhead which is relatively free from problems when moving it relative to the printing paper during the printing process.

A third object of the present invention is to provide a thermal printhead which is easy to manufacture.

A fourth object of the present invention is to provide a thermal printhead which is highly durable.

These and other objects of the present invention can be accomplished by providing a thermal printhead, comprising: a planar base plate having a major surface and an end surface, and defining a print-end surface in a part of the end surface, the end surface defining a relatively narrow width in a direction perpendicular to the plane of the major surface and a relatively large length along the plane of the major surface; a glaze layer made of glass-like material covering at least the print-end surface of the base plate; a resistive pattern, comprising a plurality of resistive elements arranged along the lengthwise direction of the base plate, placed over the part of the glaze layer corresponding to the print-end surface of the base plate; and a wiring pattern, comprising a plurality of wiring elements placed over the glaze layer in electric contact with the resistive elements, to conduct electric current to the resistive elements in a selective manner; wherein: the end surface of the base plate is provided with an inclined portion formed between the major surface and the remaining portion of the end surface substantially along the whole length of the end surface to define the print-end surface which is substantially narrower in width than the thickness of the base plate, the thickness being measured along the direction perpendicular to the plane of the major surface. Alternatively, the end surface of the base plate is provided with an inclined portion formed between the major surface and the remaining portion of the end surface substantially along the whole length of the end surface to define the print-end surface which is substantially narrower in width than the thickness of the base plate, the thickness being measured along the direction perpendicular to the plane of the major surface.

In either case, by defining a print-end surface which is substantially narrower than the thickness of the base plate, it is possible to determine the lateral dimension of the print-end surface so as to permit the formation of an optimum contour of the glaze layer by using a base plate having a thickness sufficient to ensure the necessary mechanical strength. Furthermore, the relative angle between the print-end surface and the adjoining surface which is located ahead of the print-end surface as seen in the direction of the motion of the printhead relative to the printing paper, the printhead can be smoothly slid over the printing paper while establishing an appropriate pressure therebetween.

According to a preferred embodiment of the present invention, the angle which the print end surface forms in relation with the adjoining surface is between 15 degrees and 60 degrees, and, more preferably, between 20 degrees and 45 degrees, while the width of the print-end surface is between 0.1 mm and 0.8 mm. Further, preferably, the radius of curvature of the glaze layer above the central portion is 2 millimeters or less, and the thickness of the glaze layer above the central portion is between 10 and 60 micrometers.

According to the basic concept of the present invention, the part of the base plate corresponding to the print-end surface may be either substantially planar surface or smoothly curved. If the thickness of the part of the wiring pattern overlapping the resistive pattern gradually diminishes towards the terminal end of the wiring pattern located over the resistive pattern, the contact surface of the printhead can be made highly smooth. If the ridges defined between the inclined portion and the major surface and between the inclined portion and the remaining portion of the end surface are chamfered or rounded, not only a highly smooth contact surface may be produced but also the thickness of the glaze layer may be made highly uniform.

According to the empirical data obtained by the inventors, it is preferable if $W \leqq t_0 \leqq 5$ W and $t_1 \leqq t_0/2$ where W is the effective width of the resistive pattern, $t_0$ is the width of the inclined portion, and $t_1$ is the width of each of the chamfered portions.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 4:
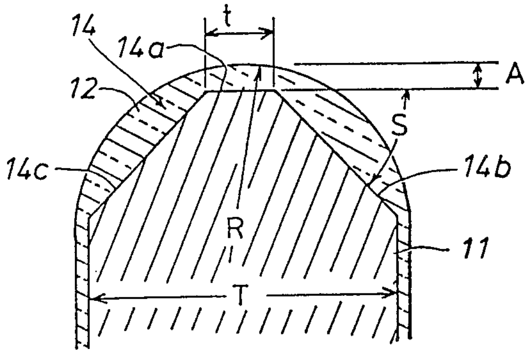
FIG. 4 is an enlarged sectional view of an improved end-surface type thermal printhead according to the present invention, likewise, taken along a line perpendicular to the direction along which the printing elements are arranged.

FIG. 4 shows an embodiment of the end-surface type thermal printhead according to the present invention. This thermal printhead comprises a base plate 11 which may consist of alumina or other ceramic material. The two lateral edges of an end surface 14 are cut obliquely so as to define a flat portion **14*a* serving as the print-end surface interposed between a pair of inclined portions 14*b* and 14*c*. These inclined portions 14*b* and 14*c* may be formed before baking the base plate 11 or after baking the base plate 11 by using hard grinding material such as diamond, ruby and so on. Thus, the width t of the flat portion 14*a* is made substantially narrower than the thickness T of the base plate 11. Preferably, the angle S which one of the planes of the inclined portions 14*b* and 14*c*, in particular the one located ahead of the flat portion 14*a* as seen along the direction of the printhead motion relative to the printing paper, forms relative to the plane of the flat portion 14*a*** may be between 15 degrees and 60 degrees.

The following table summarizes the examples of the dimensions of the various parts of this thermal printhead based on the concept of this preferred embodiment.

TABLE 1

| t (millimeters) | A (micrometers) | R (millimeters) |
|---|---|---|
| 1.0 | 80 | 2.0 |
| 0.8 | 60 | 2.0 |
| 0.5 | 40 | 1.5 |
| 0.2 | 20 | 1.0 |

Since it is particularly desirable for the radius of curvature R of the central part of the surface of the glass glaze layer 12 to be 2.0 mm or less and the thickness A of the central part of the glaze layer 12 to be 60 micrometers or less the width t of the flat portion (print-end surface) **14*a* is selected to be between 0.1 mm and 0.8 mm. If width t is greater than 0.8 mm, the thickness of the glaze layer 12 becomes greater than 60 micrometers, and the print quality is impaired. On the other hand, if the width t is less than 0.1 mm, the glaze layer 12** becomes so thin that the thermal responsiveness of the print head is impaired and, again, the print quality is impaired.

Further, according to the present embodiment, the angle S is selected to be between 15 degrees and 60 degrees. When the angle S is greater than 60 degrees, the formation of electrodes leading to the resistive elements which are arranged in the flat portion **14*a*** becomes difficult. Conversely, when the angle S is less than 15 degrees, the contact between the heat generating portion of the thermal printhead and the printing paper or the transfer ink ribbon tends to be insufficient.

Figure 1:
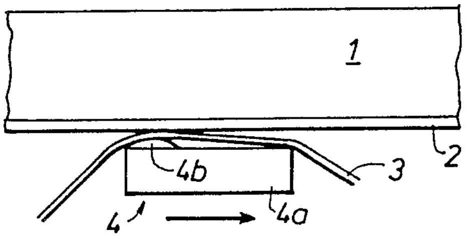
Fig. 1 PRIOR ART
FIG. 1 is a schematic plan view showing a conventional planar thermal printhead as it is being used.
Figure 2:
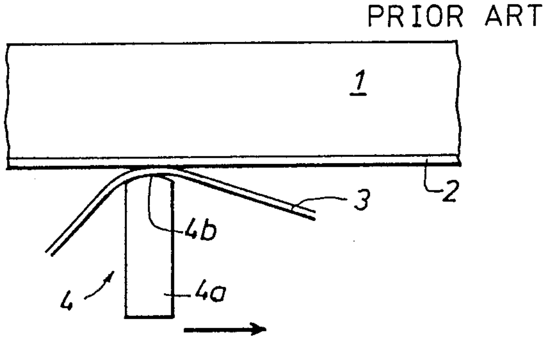
Fig. 2 PRIOR ART
FIG. 2 is a view similar to FIG. 1 showing a conventional end-surface type thermal printhead.
Figure 5:
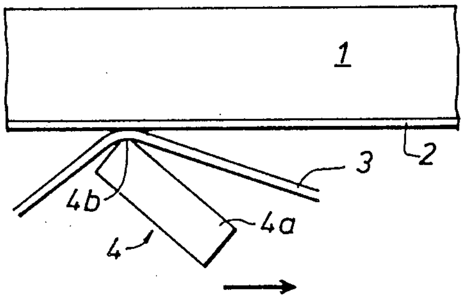
FIG. 5 is a view similar to FIGS. 1 and 2 showing a corner-edge type thermal printhead according to the present invention as it is being used.
Figure 3:
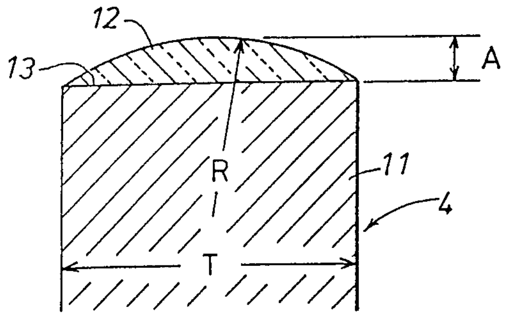
FIG. 3 is an enlarged sectional view of the end-surface type thermal printhead shown in FIG. 2 taken along a line perpendicular to the direction along which the printing elements are arranged.
Figure 6:
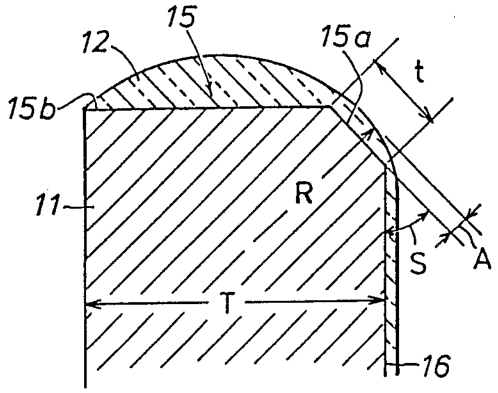
FIG. 6 is an enlarged sectional view similar to FIG. 4 showing a first embodiment of the corner-edge type thermal printhead according to the present invention.

FIG. 6 is a simplified sectional view for showing the basic concept of a different embodiment of the present invention constructed as a corner-edge type thermal printhead which is provided with a print surface formed along a corner edge of a planar base plate as shown in FIG. 5. A corner edge of the base plate 11 defined by an end surface 15 and a major surface 16 is cut into an inclined portion **15*a*, in a similar manner as chamfering, to define a print-end surface serving as a base for the heat generating portion. The remaining part of the end surface 15 is denoted with numeral 15*b*. In this embodiment also, the width t of the flat portion (print-end surface) 15*a* is selected to be between 0.1 mm and 0.8 mm. If the width t is greater than 0.8 mm, the thickness of the glaze layer 12 becomes greater than 60 micrometers, and the print quality is impaired. On the other hand, if the width t is less than 0.1 mm, the glaze layer 12** becomes so thin that the thermal responsiveness of the print head is impaired and, again, the print quality is impaired.

Figure 7:
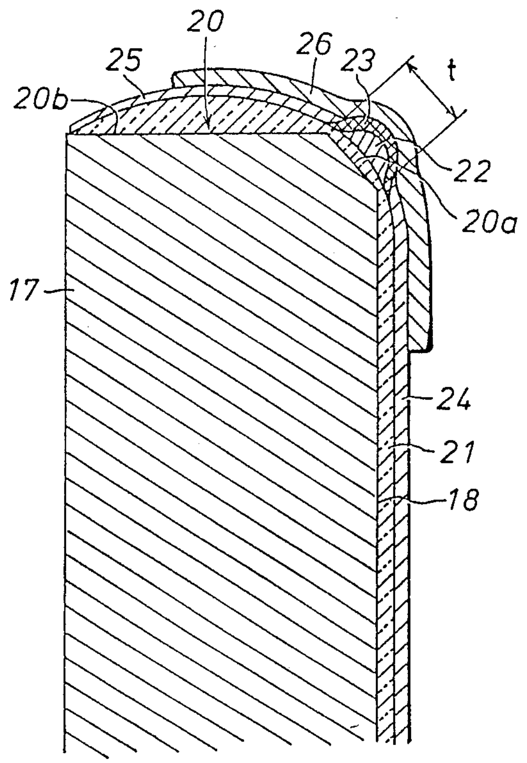
FIGS. 7 through 11 are enlarged sectional views showing different embodiments of the corner-edge type thermal printhead according to the present invention.

FIG. 7 shows a thermal printhead based on the concept represented by FIG. 6, in greater detail. An inclined portion 20*a* serving as the print-end surface is defined, in an end surface 20 of a base plate 17, between the main part 20*b* of the end surface 20 and a major surface 18 of the base plate 17. The width t of this inclined print-end surface is from 0.1 mm to 0.8 mm, and is covered by a glaze layer 21 having a thickness between 10 and 60 micrometers, preferably approximately 20 micrometers. The part of this glaze layer 21 serving as the base for the heat generating portion is further covered by a $SiO_2$ under-coat layer 22 formed by ion plating using a suitable mask. The thickness of this under-coat layer 22 may be between 10 and 150 micrometers. $Ta_2N$ is sputtered upon this under-coat layer 22 to be formed into a resistive pattern 23 for selective heat generation by selectively etching away parts of the $Ta_2N$ sputter layer as a photographic process. Cr-Au is sputtered upon fringe parts of this resistive pattern 23 and other parts of the under-coat layer 22, and selected parts of the thus deposited Cr-Au sputter layer is etched away to form wiring patterns 24 and 25 for conducting electric current to corresponding parts of the resistive pattern 23.

The resistive pattern 23 and the wiring patterns 24 and 25 are protected from wear and external influences by a protective layer 26 made of a $SiO_2$ layer formed by ion plating. Since the thicknesses of the parts of the resistive pattern 23 and the wiring patterns 24 and 25 where they overlap each other are appropriately reduced so that the overall thickness is substantially uniform across the resistive pattern 23 and the wiring patterns 24 and 25, the surface of the heat generating portion of the printhead becomes so smooth that it is not caught by fairly rough printing paper, and can favorable printhead movement can is therefore accomplished. According to this embodiment, since the heat generating portion is formed on the inclined surface formed between the end surface and the major surface, even though the contact area between the printhead and the printing paper or the transfer ink ribbon is relatively small, the movement of the printhead relative to the printing paper can be accomplished in a highly smooth manner.

Figure 8:
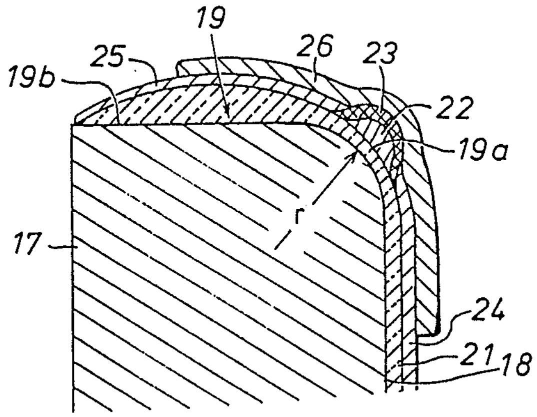

FIG. 8 shows a modified embodiment of the present invention and denotes the parts corresponding to those of the previous embodiments with like numerals. According to this embodiment, the print-end surface is formed with a curved surface 19*a*, instead of an inclined flat surface, having a radius of curvature r which may be selected from between 0.5 to 2.0 millimeters while the main part 19*b* of the end surface 19 remains to be planar and perpendicular to the major surface 18.

Figure 9:
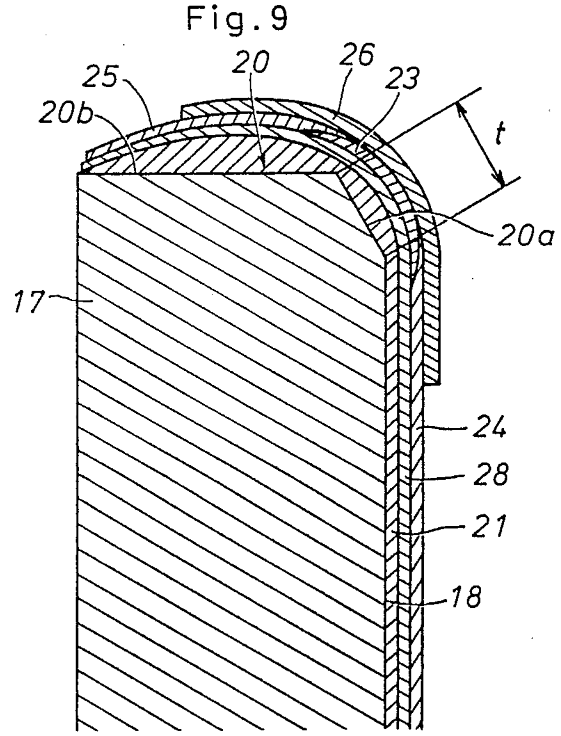

FIG. 9 shows another modified embodiment of the present invention in which the under-coat layer 28 extends beyond the boundaries of the print-end surface (the inclined portion 20*a*) and covers adjacent parts of the major surface 18 and the main part 20*b* of the end surface 20 for added stability and durability of the glaze layer 21.

In the above embodiments, some care was required to control the thickness of the glaze layer. In the case of the embodiment shown in FIG. 7, the portions of the glaze layer 21 corresponding to the ridges between the print-end surface (inclined portion 20*a*) and the main part 20*b* of the end surface 20, and between the print-end surface (inclined portion 20*a*) and the major surface 18 tend to get thinner than other parts. These ridges could even protrude from the surface of the glaze layer 21. Even in the case of the embodiment illustrated in FIG. 8, the thickness of the glaze layer 21 corresponding to the rounded corner portion or the heat generating part of the thermal printhead tends to be less than those of other parts, and the same problem could occur. Uneven thickness of the glaze layer could cause local crystallization of the glaze layer during the baking process, and the surface smoothness of the glaze layer may be impaired. Such defective printheads having uneven glaze layer thicknesses must be rejected, and this contributes to the high manufacturing cost of such thermal printheads. The embodiments illustrated in FIGS. 10 and 11 are intended to eliminate such a problem.

Figure 10:
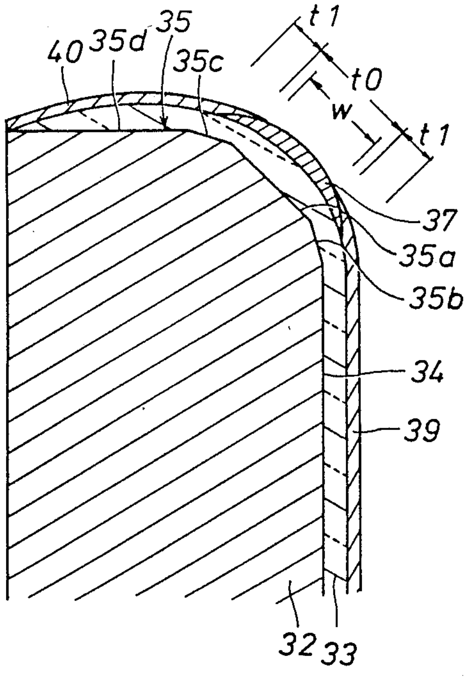

According to the embodiment given in FIG. 10, the print-end surface 35*a* is formed between the main part 35*d* of an end surface 35 and a major surface 34 of a base plate 32, and the ridges defined between the print-end surface 35*a* and the major surface 34, and between the main part 35*d* of the end surface 35 and the print-end surface 35*a* are each chamfered with a ruby grinding disk so as to define an inclined surfaces 35*b* and 35*c*. In the present embodiment, the width $t_0$ of the print-end surface 35*a* is approximately 0.2 mm, and the width $t_1$ of the inclined chamfered surfaces 35*b* and 35*c* is selected to be less than half the width $t_0$. Further, the effective width W of the resistive pattern 37 is selected to be such that $W \leqq t_0 \leqq 5W$. Preferably, $t_0$ is selected to be greater than the width W but less than 0.8 mm, to achieve a fine quality printing on relatively rough paper and a sufficiently high printing speed. The resistive pattern 37 and the wiring patterns 39 and 40 are in reality covered by an $SiO_2$ protective layer deposited by ion plating to improve the wear resistance of the printhead and prevent oxidization of the resistive pattern 37 and the wiring patterns 39 and 40 although it is not shown in the drawing. Preferably, the resistive pattern 37 and the wiring patterns 39 and 40 are formed over the glaze layer 33 by way of an under-coat layer, for instance, a $SiO_2$ layer deposited by ion plating, to prevent the oxidization of the glaze layer 33.

Figure 11:
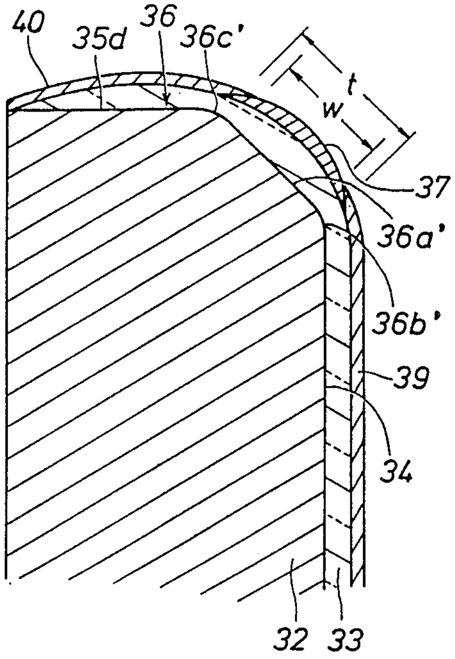

FIG. 11 shows a similar embodiment in which the ridges 36*b*' and 36*c*' between the print-end surface 36*a*' and the major surface 34, and between the main part 36*d* of the end surface 36 and the print-end surface 36*a*' are each rounded with a diamond grinding disk or the like, instead of being chamfered with inclined planar surfaces. According to the present embodiment, the transition from the print-end surface 36*a*' to the major surface 34 and the main part 36*d* of the end surface 36 is even smoother than in the previous embodiment. This embodiment also produces a similar uniformity in the thickness of the glaze layer 33.

In the above embodiments, the base plates were made of ceramic plates, but it is also possible to form the base plates from metal or alloy which can be more easily formed into desired shapes.

What we claim is:

1. A thermal printhead, comprising:

a planar base plate having a first major surface, a second major surface generally parallel to said first major surface, a print-end surface, a first inclined portion, and a second inclined portion each connecting said print-end surface with one of said major surfaces, said print-end surface defining a relatively narrow width in a direction generally perpendicular to a plane of each of said major surfaces, wherein said print-end surface extends substantially along a whole length of said base plate and is between 0.1 mm and 0.8 mm in width;

a glaze layer made of glass-like material covering said print-end surface of said base plate and a portion of said adjacent inclined portions and generally conforming to the shape of the print-end surface and inclined portions of said base plate;

a resistive pattern, comprising a plurality of resistive elements arranged along a lengthwise direction of said base plate, placed over a part of said glaze layer corresponding to said print-end surface of said base plate; and a wiring pattern, comprising a plurality of wiring elements placed over said glaze layer in electric contact with said resistive elements, to conduct electric current to said resistive elements in a selective manner, wherein said first inclined portion is formed adjacent to said first major surface, and said second inclined portion is formed adjacent to said second major surface of said base plate, and wherein said print-end surface is substantially narrower in a widthwise direction of said base plate than the thickness of said base plate, said width being measured along the direction generally perpendicular to the planes of said major surfaces.

2. A thermal printhead as defined in claim 1, wherein an angle which said print-end surface forms in relation with one of said inclined portions is between 15 degrees and 60 degrees.

3. A thermal printhead as defined in claim 1, wherein a radius of curvature of said glaze layer above said print-end surface is 2 millimeters or less, and the thickness of said glaze layer above said central portion is between 10 and 60 micrometers.

4. A thermal printhead, comprising:

a planar base plate having a major surface, an end surface, and an inclined portion connecting said major surface and said end surface defining a print-end surface which has a surface width dimension between 0.1 mm and 0.8 mm connecting said major surface to said end surface;

a glaze layer made of glass-like material covering said print-end surface and a portion of adjacent surfaces of the major surface and the end surface of said base plate and generally conforming to the shape of the print-end surface and inclined portions of said base plate;

a resistive pattern, comprising a plurality of resistive elements arranged along a lengthwise direction of said base plate, placed over a part of said glaze layer corresponding to said print-end surface of said base plate; and a wiring pattern, comprising a plurality of wiring elements placed over said glaze layer in electric contact with said resistive elements, to conduct electric current to said resistive elements in a selective manner, wherein said print-end surface is substantially narrower in a width wise direction than a thickness of said base plate, said thickness being measured along the direction perpendicular to the plane of said major surface.

5. A thermal printhead as defined in claim 4, wherein the angle which said inclined portion forms in relation with said major surface is between 15 degrees and 60 degrees.

6. A thermal printhead as defined in claim 4, wherein the angle which said inclined portion forms in relation with said major surface is between 20 degrees and 45 degrees.

7. A thermal printhead as defined in claim 4, wherein a radius of curvature of said glaze layer above said inclined portion is 2 millimeters or less, and the thickness of said glaze layer above said inclined portion is between 10 and 60 micrometers.

8. A thermal printhead as defined in claim 4, wherein the inclined portion is provided with a substantially planar surface.

9. A thermal printhead as defined in claim 4, wherein the inclined portion is provided with a smoothly curved surface.

10. A thermal printhead as defined in claim 4, wherein the wiring pattern overlaps the resistive pattern and the thickness of a part of said wiring pattern overlapping said resistive pattern gradually diminishes towards a terminal end of said wiring pattern located over said resistive pattern.

11. A thermal printhead as defined in claim 8, wherein a set of ridges defined between said inclined portion and said major surface and between said inclined portion and said end surface are chamfered.

12. A thermal printhead as defined in claim 8, wherein a set of ridges defined between said inclined portion and said major surface and between said inclined portion and said end surface are rounded.

13. A thermal printhead as defined in claim 11 wherein $W \leqq t_0 \leqq 5W$ and $t_1 \leqq t_0/2$ where W is the effective width of said resistive pattern, $t_0$ is the width of said inclined portion, and $t_1$ is the width of each of said chamfered portions.

14. A base plate for a thermal printhead, comprising:

a first major surface;

a second major surface;

a print-end surface;

a first inclined portion; and a second inclined portion wherein each inclined portion connects the print-end surface with one of said major surfaces, wherein said print-end surface defines a relatively narrow width in a direction generally perpendicular to a plane of each of said major surfaces, wherein said print-end surface extends substantially along a whole length of one side of said base plate, wherein a width of said print-end surface is between 0.1 mm and 0.8 mm, wherein said print-end surface of said base plate is substantially narrower in a widthwise direction of said base plate than a thickness of said base plate, said thickness being measured along the direction generally perpendicular to the planes of said major surfaces.

* * * * *